Feb. 26, 1935.  E. HAZELL  1,992,665
RUBBER FABRIC MATERIAL
Filed Jan. 11, 1933
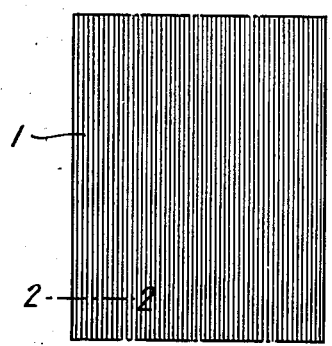
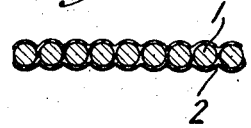
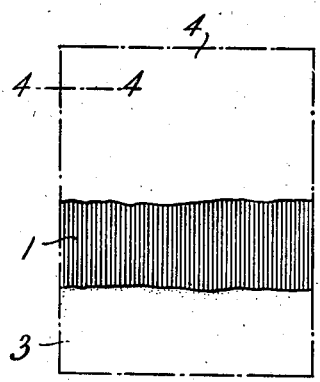
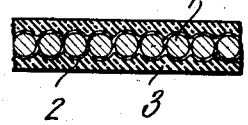
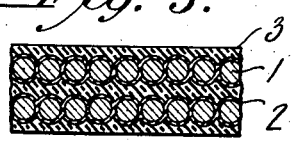
INVENTOR
EARDLEY HAZELL
BY
ATTORNEY Patented Feb. 26, 1935

1,992,665

UNITED STATES PATENT OFFICE 1,992,665

RUBBER-FABRIC MATERIAL

Eardley Hazell, New York, N. Y., assignor, by mesne assignments, to United States Rubber Company, New York, N. Y., a corporation of New Jersey Application January 11, 1933, Serial No. 651,073

14 Claims. (Cl. 154—2)

This invention relates to rubber-fabric material, and more particularly to rubber-fabric material for use in the manufacture of cord tires, hose and other articles.

In the manufacture of rubber-fabric material for use in cord tires and the like, a fabric, which may or may not be impregnated with rubber as from a solvent cement or aqueous dispersion of rubber or rubber-like material, and which may be a woven fabric or a cord fabric with or without filling threads, is used as a base material. This fabric, such as a square woven fabric, or a cord fabric with or without filling threads, the latter fabric being merely a series of parallel cords, is usually first coated with a thin "friction" coating of rubber by passing the same through a bath of aqueous dispersion of rubber, or a bath of rubber solvent cement, or by friction-calendering onto the fabric a rubber composition which is preferably softened with an organic solvent, such as naphtha, gasoline, or the like. A skim-coating of rubber is then generally calendered onto the thus treated fabric and the composite rubber-fabric material finally formed may be used in the preparation of tire carcasses in the manufacture of cord tires and the like. The patent to Hopkinson No. 1,424,020 describes the preparation of a so-called "weftless fabric" by passing a series of parallel cords through a bath of an aqueous dispersion of rubber and joining the cords together by the dried rubber deposit from the dispersion adhering to the cords after the same have been withdrawn from the bath. The parallel cords may be arranged so that each cord touches the cord on either side of the same or they may be separated any desired distance as is well known in the art today. This rubber coated material is then generally skim-coated on one or both sides to form the finished rubber-fabric material used in the manufacture of tire casings. The skim-coating may be applied on the rubber treated fabric by a calendering operation or, if desired, by further treatment with an aqueous dispersion or solvent solution of rubber. It has been suggested for better flexing to provide a coating of rubber next to the fabric by calendering onto the fabric a rubber-solvent composition in unvulcanized condition which when vulcanized will form a relatively hard and stiff soft-vulcanized rubber, and calendering thereover a skim-coating of rubber in unvulcanized condition which when vulcanized will form a softer rubber composition than the rubber next to the fabric.

The present invention relates to the manufacture of rubber-fabric materials and tire casings made from the same, wherein the flexing qualities of the rubber-fabric material are greatly improved, thereby allowing the tire casings to stand up a greater length of time before any separation of the rubber and fabric components can occur.

Several embodiments of the invention are illustrated in the accompanying drawing in which:

Figure 1 illustrates a top plan view of a section of a cord fabric treated with an aqueous dispersion of rubber according to the present invention;

Fig. 2 represents an enlarged sectional view on the line 2—2 of Fig. 1;

Fig. 3 shows the treated fabric of Fig. 1 with the skim coating applied to both sides of the fabric, portions being broken away;

Fig. 4 is an enlarged sectional view on the line 4—4 of Fig. 3; and

Fig. 5 is a sectional view similar to Fig. 4 but showing a plied rubber-fabric material.

In carrying out my invention, I first apply to a fabric base, which may be impregnated with rubber or other material, if desired, and which may be the usual woven fabric base or a cord fabric, with or without filling threads, a coating of rubber of a strongly basic or alkaline character, and over such treated fabric I apply a skim-coating of rubber of a substantially less basic or alkaline character. I prefer to apply the rubber composition next to the fabric by passing the fabric, or cords, through an aqueous dispersion of rubber containing an alkaline material, such as a fixed alkali, and drying. The presence of this fixed alkali results in a hard brashy cure of the rubber composition on vulcanization. The alkali may be introduced into the latex in the form of polysulphide, or as a soap, or as a hydroxide, or as a strongly basic salt such as tri-sodium phosphate, etc., in order to produce the hard brashy cure of the rubber composition on vulcanization. Over this basic rubber composition I apply a skim-coating of rubber of a substantially less basic character which rubber likewise may be deposited from an aqueous dispersion of rubber, or may be deposited from a solvent rubber cement. The skim-coating, however, I prefer to apply by a calendering operation, and if the coating immediately adjacent to the cords is of a basic composition, the skim-coating may be neutral, or slightly acidic, or may be basic but of a substantially less basic character than the coating next to the cords. The rubber compositions are applied to the fabric or cords in unvulcanized condition, and commonly vulcanization is made to take place after the article, such as a tire, or hose, has been completely assembled. After vulcanization, the basic rubber composition next to the fabric constitutes a relatively hard but resilient soft-rubber composition, while the less basic skim-coating is relatively softer, and this hardness gradient improves greatly the flexing qualities of the rubber fabric material and greatly increases the length of time that a casing, such as a tire casing, will stand up before incipient separation of the rubber and fabric components.

The following examples clearly illustrate the improvement due to the hard brashy type of cure due to the basicity of the coating next to the base fabric and the hardness differential between such coating and the skim-coating.

A "weftless fabric" was prepared by passing a series of parallel cords once through the latex composition I below and dried. Likewise "weftless fabrics" were prepared by passing parallel cords through latex compositions II and III.

*Latex compositions (parts by weight)*

|  | I | II | III |
|---|---|---|---|
| Rubber as ammonia preserved latex | 100 | 100 | 100 |
| Spindle oil (as emulsion) | 15 | 15 | 15 |
| Ground sulphur (as paste) | 2 |  | 2 |
| Sulphur as sodium polysulphide solution |  | 2 |  |
| Sodium hydroxide (as water solution) |  |  | 1 |
| Triethyl-trimethylene triamine | .375 | .375 | .375 |
| Water sufficient to make 25% total solids. |  |  |  |

In the case of each of the "weftless fabrics" treated with latex compositions I, II and III respectively, a skim-coating was applied by calendering on a rubber composition, softened with naphtha, as follows, parts being by weight:

Pale crepe _____ 50
Smoked sheet _____ 50
Sulphur _____ 3.75
Zinc oxide _____ 5
Spindle oil _____ 5
Heptaldehyde aniline condensation product _____ .50

Samples of the fabrics coated with the latex compositions I, II and III and then skim-coated with the rubber composition above described, were then cured at 40 pounds gauge saturated steam pressure for varying periods of time, 30, 45, 60, 75 and 90 minutes and the samples tested for their resistance to flexing by the method commonly used in the tire industry described by Gibbons in Ind. and Eng. Chem.—Analytical Edition, vol. 2, p. 99, Jan. 15, 1930, in which samples of the rubber fabric material are built up to the desired thickness, cut into pads which are usually 5″ x 8″, and the pads vulcanized in a mold. After vulcanization the pads are removed from the mold and allowed to stand for about 36 hours, after which they are cut into strips usually 1″ x 8″. The strips are then subjected to a flexing test in which each strip is secured in a machine by its ends while the intermediate portion of the strip is in contact with a weighted pulley. The strip is then pulled back and forth around the pulley at the rate of about 160 cycles per minute until separation of the plies begins, and the number of cycles required to cause separation of the rubber from the fabric is noted. The tests on the various samples are shown in the following table, the "flexing resistance (kilocycles)" being the number of thousand of cycles required to cause separation of the rubber from the fabric, the higher the "flexing" value, of course, the better the flexing qualities of the rubber fabric material.

*Flexing resistance (kilocycles)*

| Time of cure at 40 lb. (min) | I | II | III |
|---|---|---|---|
| 30 | 20.4 | 41.0 | 38.1 |
| 45 | 28.0 | 42.6 | 45.3 |
| 60 | 39.7 | 71.0 | 82.0 |
| 75 | 35.0 | 60.2 | 64.5 |
| 90 | 40.5 | 63.0 | 67.3 |

Examples II and III which have a more basic coating from latex than the calendered skim coating have clearly better flexing qualities than Example I where there is no appreciable difference in basicity between the coating from latex and the skim-coating.

To show that it is the difference in basicity of the two coatings that is responsible for the increased flexing qualities and not the basicity itself, the following tests were made:

A basic coating was applied to samples of parallel cords from a latex composition containing (parts by weight):

Rubber as latex _____ 100
Sulphur as sodium polysulphide _____ 3.50
Zinc oxide _____ 5
Triethyl-trimethylene triamine _____ .375 and skim-coatings were applied from a rubber stock compounded as above for Examples I, II and III, excepting that 75 parts of alkali-process whole tire reclaim were added per 100 parts of rubber. This gave a basic skim-coating as well as basic coating from latex, and thus an alkaline type of cure in each but without a substantial difference in basicity between them. In this case the optimum flexing resistance obtained (at 60 minute cure and 40# steam pressure) was only 10–12 kilocycles. To the skim-coating containing alkali-process whole tire reclaim as above were added successive amounts of an acidic material (zinc chloride) to off-set the effect of the alkali in the reclaim and to reinstate the alkali differential of the two coatings, together with .2 part per 100 of crude rubber, of additional accelerator to maintain approximately the same rate of cure.

The results of the above tests were as follows:

| Parts $ZnCl_2$ per 100 parts crude rubber | 0 | 1.75 | 2.0 | 2.25 |
|---|---|---|---|---|
| Flexing resistance (kilocycles) | 10–12 | 62.7 | 74.2 | 62.2 |

From the above tests, a more basic coating from latex adjacent the fabric base than the skim-coating applied over the first coating is shown conclusively to vastly improve the flexing characteristics of a rubber fabric material.

The product of the present invention is illustrated in detail in the drawing in which a cord fabric composed of parallel cords 1 is coated with a solids deposit 2 of a latex composition, and skim coating 3 applied to both sides of the latex treated cord fabric by calendering on a rubber composition. The treated fabric may be plied as shown in Fig. 5. The skim coating may be applied, if desired, only to one side of the latex-treated fabric, the skim-coat of each ply then serving also as the skim-coat for one side of the adjacent ply.

The triethyl trimethylene triamine in the latex composition, and the heptaldehyde-aniline condensation product in the rubber mix, are common accelerators of vulcanization, but it is obvious that other accelerators may be used, as well as other compounding ingredients than those shown, as desired. Moreover, the organic accelerator employed in the latex composition need not be basic in character. The sodium hydroxide in the latex composition produces a more basic rubber next to the fabric material than is present in the skim coating, resulting in a brashy and a harder type of cure in the rubber composition next to the cords, than in the skim coat. This is true notwithstanding the fact that a slightly greater amount of sulphur is used in the rubber mix in the skim coating than is present in the latex composition. However, it is not within the present invention to increase the sulphur in the skim coating over that in the rubber composition next to the cords or fabric to such an extent that a harder vulcanized rubber, by virtue of the increased amount of sulphur in the skim coating than in the friction coating will result.

It is understood that the invention is not limited to the specific embodiments described and shown in the examples as it will be evident to those skilled in the art that the invention permits of various modifications without departing from the spirit thereof, and it is my intention not to be limited in the scope of the invention except as required by the state of the art and as set forth in the appended claims.

Having thus described my invention, what I claim and desire to protect by Letters Patent is:

1. In the manufacture of rubber-fabric material, the steps of applying a coating of rubber from an aqueous dispersion of rubber on a fabric base, and applying a skim-coating over said first coating of rubber of a less basic character than said first coating.

2. In the manufacture of rubber-fabric material, the steps of applying a basic coating of rubber from an aqueous dispersion of rubber on a fabric base, and applying a skim-coating over said first coating of rubber of a less basic character than said first coating.

3. In the manufacture of rubber-fabric material, the steps of applying a coating of rubber from an aqueous dispersion of rubber containing a fixed alkali on a fabric base, and applying a skim-coating over said first coating of rubber of a less basic character than said first coating.

4. An article of manufacture comprising a fabric base, a coating of the solids deposit of an aqueous dispersion of rubber on said base, and a skim-coating over said first coating of rubber of a less basic character than said first coating.

5. An article of manufacture comprising a fabric base, a coating of the solids deposit of a basic aqueous dispersion of rubber on said base, and a skim-coating over said first coating of rubber of a less basic character than said first coating.

6. An article of manufacture comprising a fabric base, a coating of the solids deposit of a basic aqueous dispersion of rubber containing a fixed alkali on said base, and a skim-coating over said first coating of rubber of a less basic character than said first coating.

7. An article of manufacture comprising a fabric base and a layer of rubber over said base, the rubber immediately adjacent to the fabric being a deposit of an aqueous dispersion of rubber and of a more basic character than the rubber at a greater distance therefrom.

8. An article of manufacture comprising a fabric base and a layer of rubber over said base, the rubber immediately adjacent to the fabric being a basic rubber deposit of an aqueous dispersion of rubber and of a more basic character than the rubber at a greater distance therefrom.

9. An article of manufacture comprising a fabric base and a layer of rubber over said base, the rubber immediately adjacent to the fabric being a deposit of an aqueous dispersion of rubber containing a fixed alkali and of a more basic character than the rubber at a greater distance therefrom.

10. A pneumatic tire casing comprising plies or layers of fabric and vulcanized rubber, the rubber immediately adjacent to each fabric layer being the deposit of an aqueous dispersion of rubber and having a more basic character than the rubber intermediate of the fabric layers.

11. A pneumatic tire casing comprising plies or layers of fabric and vulcanized rubber, the rubber immediately adjacent to each fabric layer being the deposit of a basic aqueous dispersion of rubber and having a more basic character than the rubber intermediate of the fabric layers.

12. A pneumatic tire casing comprising plies of cords and vulcanized rubber, the cords in each ply being parallel to each other, and the rubber sheathing the cords being the deposit of an aqueous dispersion of rubber and having a harder character than the rubber intermediate the plies of cords.

13. A pneumatic tire casing comprising plies of cords and vulcanized rubber, the cords in each ply being parallel to each other, and the rubber sheathing the cords being the deposit of an aqueous dispersion of rubber and having a more basic character than the rubber intermediate the plies of cords.

14. A pneumatic tire casing comprising plies of cords and vulcanized rubber, the cords in each ply being parallel to each other, and the rubber sheathing the cords being the deposit of a basic aqueous dispersion of rubber and having a more basic character than the rubber intermediate the plies of cords.

EARDLEY HAZELL.